UNITED STATES PATENT OFFICE 2,587,043

PREPARATION OF 1,2,DI-PRIMARY AMINES

Walter Lincoln Hawkins, Summit, N. J., assignor to Bell Telephone Laboratories, Incorporated, New York, N. Y., a corporation of New York No Drawing. Application January 6, 1949, Serial No. 69,609

3 Claims. (Cl. 260—583)

This invention relates to methods of preparing diamines with the amino groups on adjacent carbon atoms.

According to the method of this invention, diamines are prepared by the hydrolysis of dihydroimidazoles prepared by the catalytic hydrogenation of alpha amino nitriles having acylated amino groups. In prior preparations of diamines by the catalytic hydrogenation of alpha amino nitriles it has not been possible to produce diprimary diamines to any appreciable extent since reduction has been accomplished only when an alkyl substituent has been present on the amino nitrogen and reduction has been accomplished with reasonably good yield (as high as 50 per cent) only when the amino group has been disubstituted.

By the process of the present invention, diprimary diamines may be obtained from alpha amino nitriles in yields which are comparable with the best yields which previously were obtainable only from dialkylated alpha amino nitriles, from which only primary-tertiary diamines were produced. In the process of the present invention, the amino group of the amino nitrile is protected by acylation prior to the hydrogenation. The immediate product of hydrogenation is not a diamine, as is produced in the reduction of a dialkylated amino nitrile, but instead is a dihydroimidazole, which upon subsequent hydrolysis yields the diamine.

The course of the reaction can be illustrated, by way of example, by the following preparation of 2-methyl-1,2-diamino butane from 2-methyl-2-aminbutyronitrile:

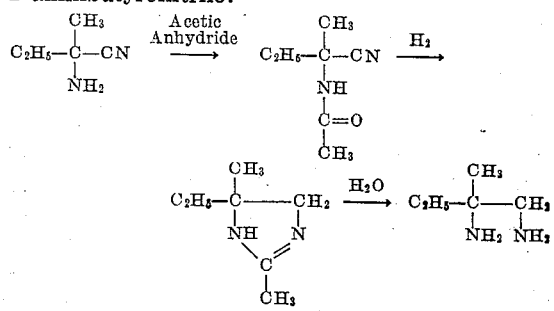

An analogous reaction can be carried out with any amino nitrile in which the —CN radical and the amino radical are bonded to the same carbon atom, that is any amino nitrile of the structure:

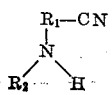

where $R_1$ is any divalent organic radical bonded through one of its carbon atoms to both the —CN and amino radicals and $R_2$ is hydrogen or any monovalent organic radical bonded through one of its carbon atoms to the amino nitrogen, particularly a radical bonded to the amino nitrogen through an aliphatic carbon atom.

The radical $R_1$ may be a non-benzenoid ring, particularly a saturated cyclic radical, or more particularly a hydrocarbon ring, such as a cyclohexylidene radical, or it may have the structure

where $R_4$ and $R_5$ are hydrogen or any monovalent organic radical. The radicals $R_4$ and $R_5$, as well as the radical $R_2$ above, will most commonly be hydrogen or a monovalent hydrocarbon radical, more particularly an alkyl radical, particularly a hydrocarbon radical or alkyl radical containing up to six carbon atoms. The best yields are obtained when $R_2$ is either hydrogen or a methyl radical.

The amino nitriles referred to above may be acylated with any monocarboxylic acid or its anhydride. Thus any acid of the structure

or its anhydride may be used, where $R_3$ is any monovalent organic radical bonded through one of its carbon atoms to the carboxyl group. The radical $R_3$ will most commonly be hydrogen or a monovalent hydrocarbon radical, more particularly an alkyl radical, particularly an alkyl radical containing up to about six carbon atoms.

The reaction by which the diamine is produced from the amino nitrile can be written generally as follows:

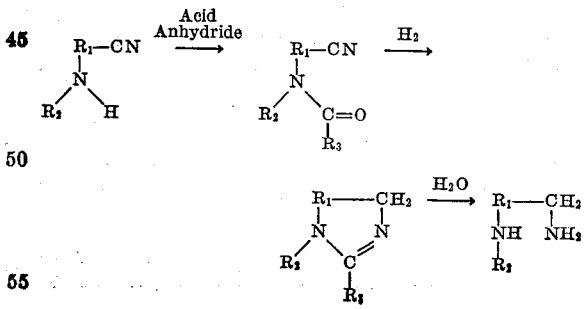

where the radicals $R_1$, $R_2$ and $R_3$ are of the character referred to above.

The following specific example will illustrate the manner in which the process of the present invention may be carried out.

Example 1

2-methyl-1,2-diamino butane was prepared, starting with methyl ethyl ketone, by the following reaction:

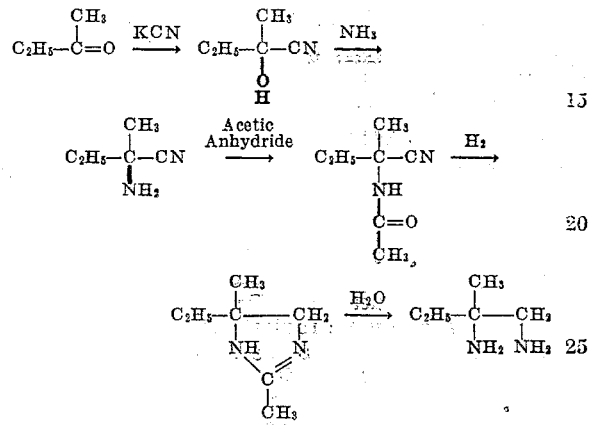

In carrying out this preparation, 72 grams of methyl ethyl ketone were added with rapid stirring to 150 cubic centimeters of a saturated aqueous solution of sodium bisulfite (containing 104 grams of the bisulfite) and to the resulting suspension of the bisulfite addition product was added an excess (87 grams) of potassium cyanide dissolved in 150 cubic centimeters of water. The reaction mixture was stirred rapidly for 90 minutes, after which the resulting cyanhydrin was allowed to separate out as an oily layer and was transferred to a stainless steel, high pressure bomb which had been chilled previously in a Dry Ice bath. Liquid ammonia (150 grams) was then introduced into the bomb, which was then sealed. The reaction mixture was allowed to come to room temperature slowly in the sealed bomb and held there for 18 hours. The excess ammonia was then allowed to evaporate off and the residue was fractionated, giving a 73 per cent yield of 2-methyl-2-aminobutyronitrile. The aminonitrile (115 grams) was dissolved in 600 cubic centimeters of acetic anhydride while cooling in an ice-water bath. After this solution had remained at room temperature for 18 hours, the excess acetic anhydride was distilled off at an absolute pressure of 10 millimeters of mercury and the residue was fractionated under a vacuum in an atmosphere of nitrogen, giving 2-methyl-2-acetaminobutyronitrile in a yield of 83 per cent or a yield of 61 per cent based on methyl ethyl ketone. The acetylated aminonitrile (70 grams), dissolved in 30 cubic centimeters of absolute ethanol, 100 cubic centimeters of Raney nickel catalyst, prepared by leaching the aluminum from an aluminum-nickel alloy with caustic solution and 200 grams of liquid ammonia were placed in a chilled stainless steel, high pressure bomb and were subjected to a hydrogen pressure of 2,000 pounds per square inch at 90° C. After 90 minutes, two mols of hydrogen per mol of nitrile had been taken up. The same result is achieved in the absence of the ammonia or in the presence of methylamine. The catalyst was then removed by filtration, the solvent was distilled off, and the residue was fractionated under vacuum in an atmosphere of nitrogen. A yield of 88 per cent of 2,4 - dimethyl - 4 - ethyldihydroimidazole was obtained. The dihydroimidazole (20 grams) was added to 100 cubic centimeters of a 30 per cent aqueous solution of potassium hydroxide. This mixture was heated at somewhat above 100° C. under reflux for five hours, solution being complete at this point. The solution was allowed to cool in an ice-water bath and, during the cooling, 70 grams of solid potassium hydroxide were added, causing the diamine which had been produced to separate out as an oily layer, which was separated off and dried over potassium hydroxide pellets. The 2-methyl-1,2-diaminobutane which was thus produced was obtained in a yield of 83 per cent based on the dihydroimidazole, or 73 per cent based on the acetylated aminonitrile, or 60 per cent based on the amino nitrile.

The reaction given above may proceed starting with aldehyde, such as acetaldehyde, propionaldehyde, or n-heptaldehyde, or other ketones, such as acetone, diethyl ketone, ethyl propyl ketone, or cyclohexanone. Thus, as the starting material, any compound of the structure

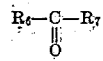

may be used which will not expend itself in self-polymerization and thus prevent the reaction from proceeding. The radicals $R_6$ and $R_7$ may be hydrogen or any monovalent organic radical bonded through one of its carbon atoms to the carbonyl group, but since formaldehyde tends to polymerize, only one of the two radicals should be hydrogen. Most commonly $R_6$ and $R_7$ will be hydrogen or a monovalent hydrocarbon radical, particularly an alkyl radical and more particularly an alkyl radical containing up to six carbon atoms. $R_6$ and $R_7$ may also constitute a single bridging radical as in cyclohexanone.

In the formation of the amino nitrile from the cyanhydrin, other amines, such as methylamine and ethylamine, may be used in place of ammonia. In general, any primary amine in which the amino group is bonded to an aliphatic carbon atom may be used, particularly any monoalkyl monoamine, more particularly any such amine containing up to six carbon atoms.

The hydrogenation of the acylated amino nitriles is carried out in the presence of a hydrogenation catalyst. The rate of reduction tends to increase with increasing hydrogen pressure and increasing temperature. For reasonably rapid reduction, it is desirable that the hydrogen pressure be at least about 500 pounds per square inch. The upper limit to the pressure employed is set only by the mechanical strength of the pressure vessel and will not ordinarily exceed about 10,000 pounds per square inch. Pressures up to about 2,500 pounds per square inch will ordinarily be found convenient to use, with the pressure of commercial tank hydrogen, 2,000 pounds per square inch, the most convenient.

The temperature during hydrogenation should ordinarily be at least 50° C. for reasonably rapid reduction and may range as high as 250° C. Preferably, the reaction will be carried out within the temperature range of about 90° C. to about 150° C. The reaction is allowed to proceed in each case until it is complete, a longer time being required under conditions under which the reaction is slower. At 90° C. and under a hydrogen pressure of 2,000 pounds per square inch, the reaction is complete in 90 minutes with 2-methyl-2-acetaminobutyronitrile.

The hydrolysis of the dihydroimidazole may be carried out with an acid or alkaline hydrolytic agent. Among those found particularly desirable are hydrochloric acid, particularly 30 per cent hydrochloric acid, and potassium hydroxide, particularly 30 per cent aqueous potassium hydroxide. Since hydrolysis is speeded at elevated temperature, it is desirable that the reaction be carried on at such elevated temperatures. It is ordinarily desirable that temperatures of at least about 100° C. be used, although obviously lower temperatures may be used where a longer reaction time is not objectionable. Temperatures up to 180° C. and higher have been found suitable. In any case, suitable means, such as a reflux condenser or a sealed chamber, should be employed to avoid loss of the water.

The time for which the hydrolytic reaction is allowed to proceed depends upon the yield desired and the speed of reaction under the conditions employed.

The diamines produced by the present invention may be reacted with tartaric acid to form diamine tartrates which may be crystallized from aqueous solution to form piezoelectric crystals. The process of the present invention may also be used for the formation of certain diamines which are useful either directly as pharmaceuticals of antihistaminic activity or as intermediates for the production of such pharmaceuticals.

The invention has been described in terms of its specific embodiments and, since certain modifications and equivalents will be apparent to those skilled in the art, this description is intended to be illustrative of, rather than to constitute a limitation upon, the invention.

What is claimed is:

1. The method of forming 2-methyl-1,2-diamino butane from 2-methyl-2-aminobutyronitrile, which method comprises acylating the amino group of said 2-methyl-2-aminobutyronitrile, catalytically hydrogenating said acylated 2-methyl-2-aminobutyronitrile with gaseous hydrogen to form 2,4-dimethyl-4-ethyl dihydroimidazole and hydrolyzing said dihydroimidazole to form 2-methyl-1,2-diamino butane.

2. The method of forming 1,2 diprimary diamines which comprises acylating the amino group of an amino mononitrile of the structure

where $R_1$ is a lower aliphatic radical having one of its carbon atoms bonded to both the —CN and amino radicals, acylating the amino group of said nitrile, forming a dihydroimidazole by catalytically hydrogenating the acylated aminonitrile with gaseous hydrogen, and forming a diprimary diamine by hydrolyzing said dihydroimidazole.

3. The method of claim 2 in which $R_1$ has the structure

where $R_4$ and $R_5$ are alkyl radicals containing up to six carbon atoms.

WALTER LINCOLN HAWKINS.

REFERENCES CITED

The following references are of record in the file of this patent:

UNITED STATES PATENTS

| Number | Name | Date |
| --- | --- | --- |
| 1,992,615 | Hoffman et al. | Feb. 26, 1935 |
| 2,392,326 | Kyrides | Jan. 8, 1946 |
| 2,409,061 | Norris | Oct. 8, 1946 |
| 2,418,077 | Kyrides et al. | Mar. 25, 1947 |

OTHER REFERENCES

Buckley et al., J. Chem. Soc., 1947, pp. 1500–1503.

Morton, "The Chemistry of Heterocyclic Compounds," McGraw-Hill Book Co., New York, N. Y., 1946, pp. 406–409.